March 19, 1946. H. H. LOGAN 2,396,864
HYDRAULIC PRESSURE SYSTEM
Filed June 19, 1944 5 Sheets-Sheet 3
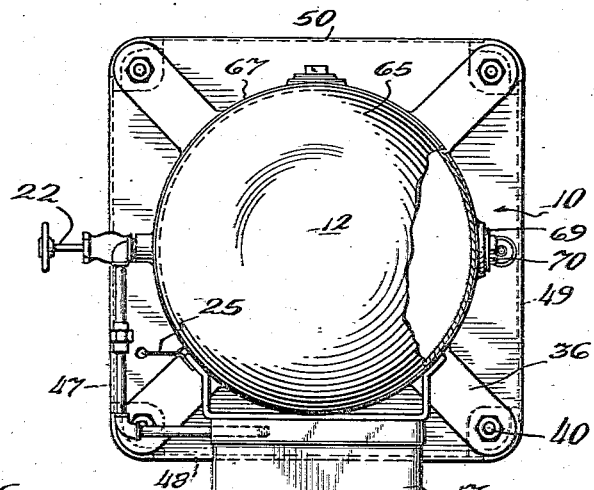
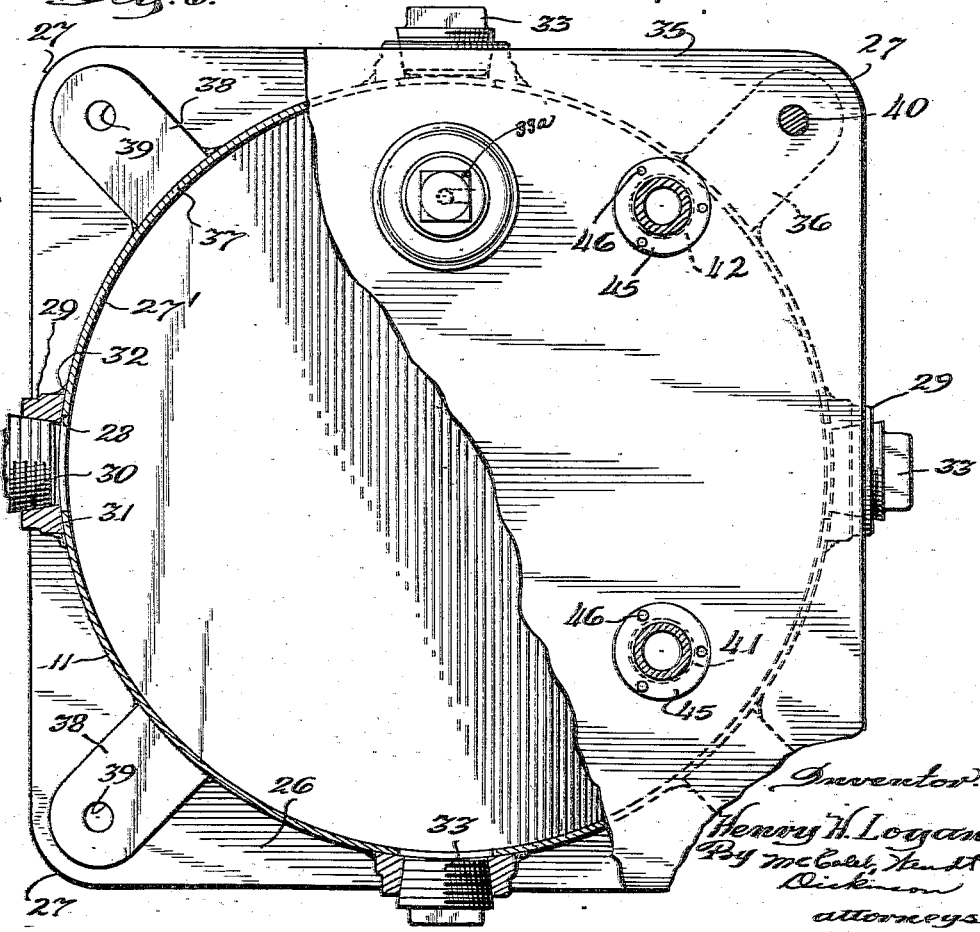

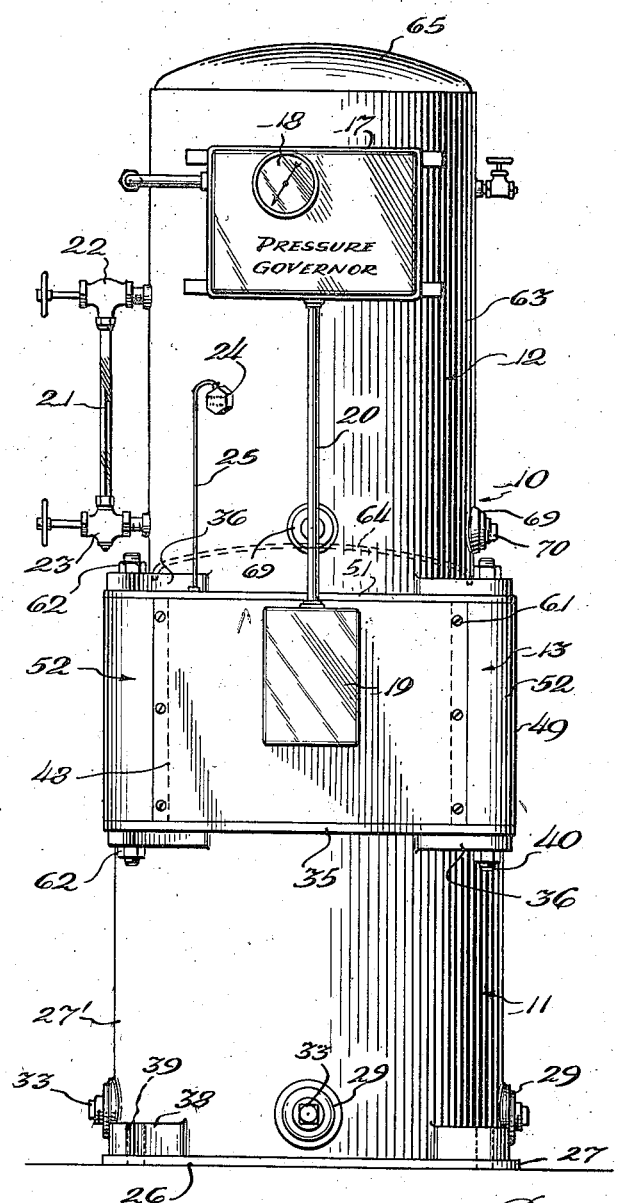

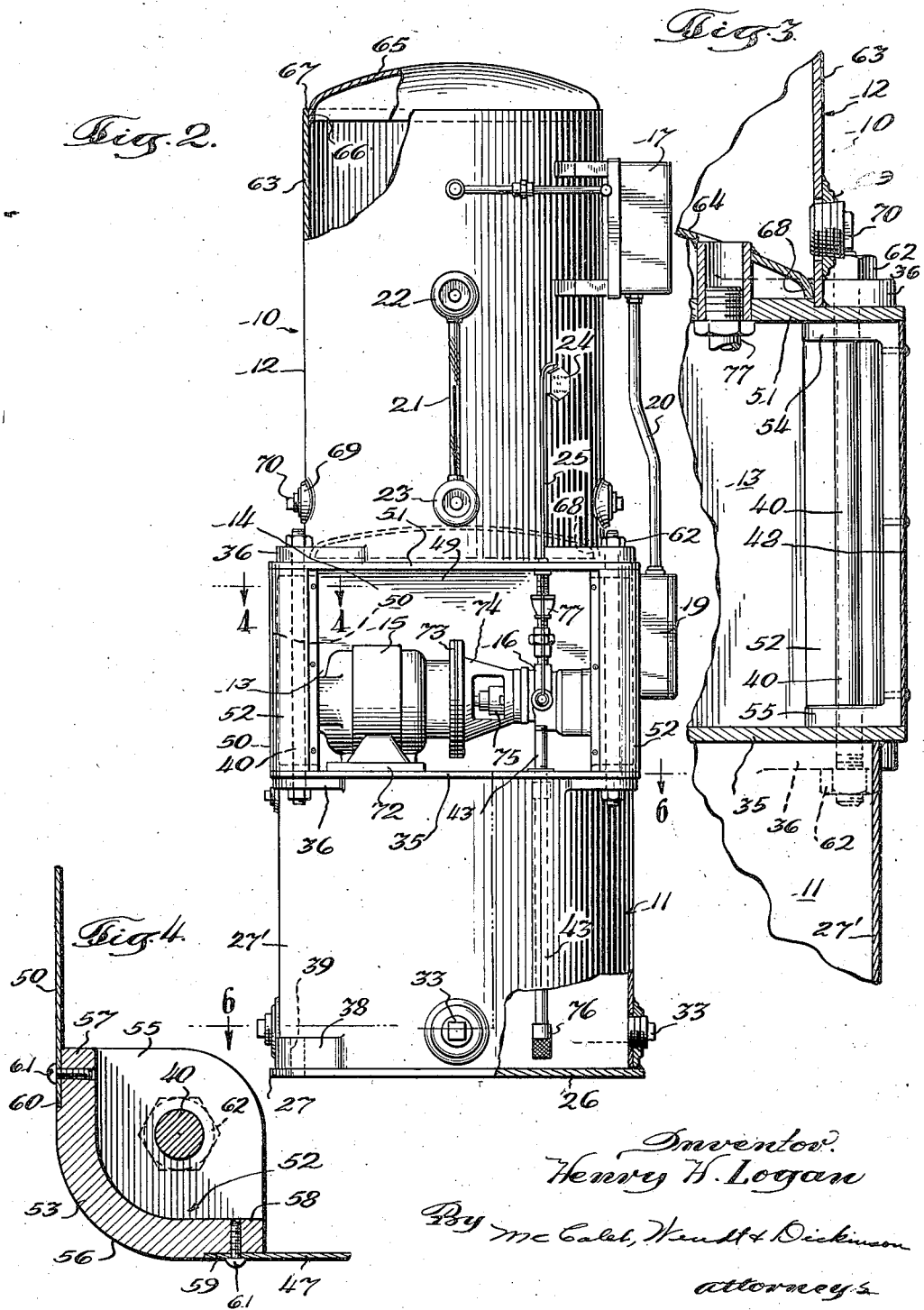

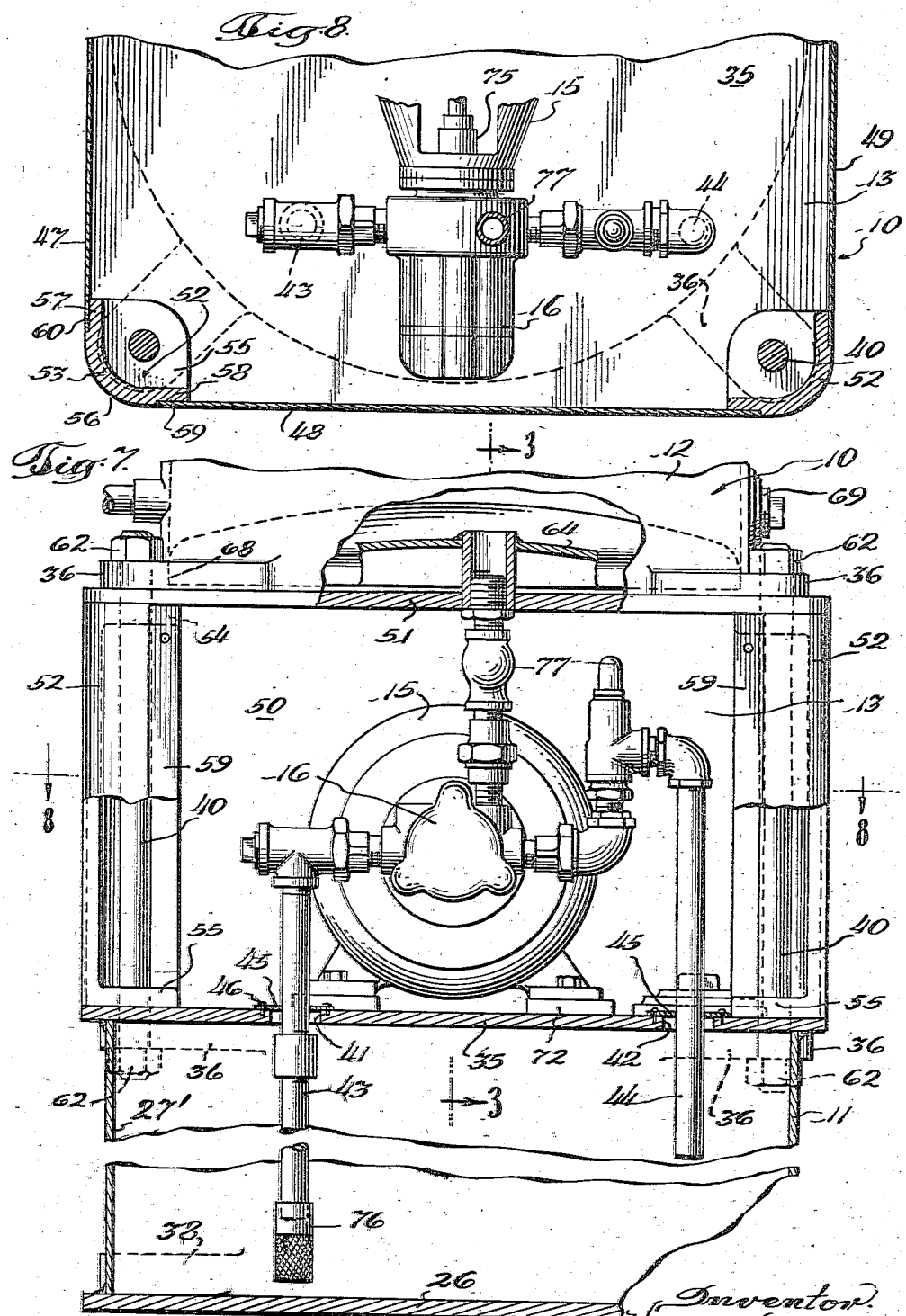

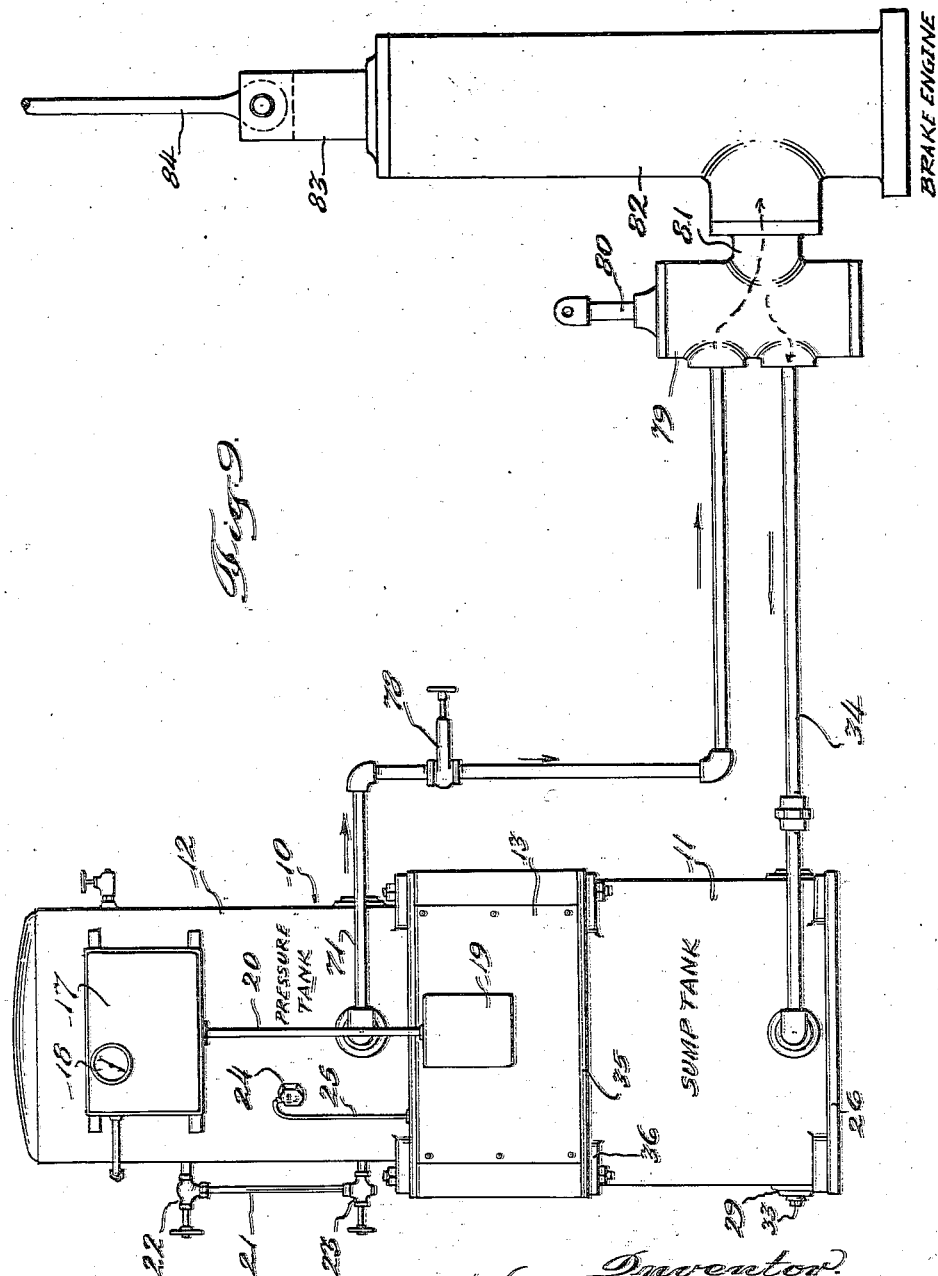

Patented Mar. 19, 1946

2,396,864

UNITED STATES PATENT OFFICE 2,396,864

HYDRAULIC PRESSURE SYSTEM

Henry H. Logan, Chicago, Ill., assignor to Logan Engineering Co., Chicago, Ill., a corporation of Illinois Application June 19, 1944, Serial No. 540,925

14 Claims. (Cl. 103—218)

The present invention relates to hydraulic pressure systems, and is particularly concerned with pressure systems or hydraulic accumulators of the type adapted to be used for the operation of hydraulic cylinders, such as those of brake engines used on mine hoists.

In the operation of such hydraulic cylinders it is necessary to provide some form of means for accumulating hydraulic fluid under pressure because if the pressure fluid were to be taken directly from a pump, it would be necessary to have an abnormally large pump and a motor of corresponding power for the lack of which the available piston speed would be too slow.

The available pressure systems of the prior art have the disadvantage of involving relatively heavy and bulky apparatus, inefficiently arranged in such manner that it occupies a considerable space. These prior art devices are also difficult to ship and to install, particularly in locations where a large device is required in a limited amount of space.

One of the objects of the invention is the provision of an improved hydraulic pressure system for the operation of hydraulic cylinders in which the apparatus is so constructed that it consists of a plurality of separate units that are capable of being easily "knocked down" for transportation and adapted to be assembled into a compact pressure system unit which embodies all of the necessary appliances and controls in a minimum amount of space.

Another object of the invention is the provision of an improved hydraulic pressure accumulator unit which is sturdy, efficient, and which has a relatively greater capacity than the devices of the prior art, which occupy the same or a greater amount of space.

Another object of the invention is the provision of an improved hydraulic accumulator unit in which the most of the controlling and power driven devices are enclosed and protected against unauthorized tampering and access to dust and other deleterious influences and which presents a finished appearance so that it may be installed in exposed places without detracting from the aesthetic arrangements.

Another object of the invention is the provision of an improved hydraulic accumulator unit which utilizes a minimum amount of piping for intercommunication between the various parts of the system and which is adapted to be used for a long period of time without necessity for replacement or repair of its parts.

Other objects and advantages of the invention will be apparent from the following description and the accompanying drawings, in which similar characters of reference indicate similar parts throughout the several views.

Referring to the drawings, of which there are five sheets,

Fig. 1 is a side elevational view of the pressure accumulator unit embodying the invention;

Fig. 2 is a side elevational view, taken from the left end of Fig. 1, in partial section, and with a part of the housing removed, showing the details of construction and mode of assembly of the various parts of the unit;

Fig. 3 is a fragmentary sectional view, taken on the plane of the line 3—3 of Fig. 7;

Fig. 4 is a fragmentary sectional view of the corner structure of the housing, which encloses the motor and pump, taken on the plane of the line 4—4 of Fig. 2, looking in the direction of the arrows;

Fig. 5 is a top plan view of the unit of Fig. 1, partially broken away, and shown in section to show the details of construction;

Fig. 6 is a horizontal sectional view, taken on the plane of the line 6—6 of Fig. 2, looking in the direction of the arrows;

Fig. 7 is a fragmentary elevational view in partial section, showing an end elevational view of the pump installation;

Fig. 8 is a fragmentary sectional view, taken on the plane of the line 8—8 of Fig. 7, looking in the direction of the arrows; and Fig. 9 is a diagrammatic elevational view of the piping and other apparatus included in an installation utilizing the pressure system which embodies my invention.

Referring to Figs. 1 to 3, 10 indicates the hydraulic accumulator unit, some of the most important elements of which are the sump tank 11 and the pressure tank 12, which are preferably arranged one above the other in such manner as to provide an intermediate housing 13 with a chamber 14 for receiving the electric motor 15 and the pump 16.

The unit also preferably includes a suitable type of pressure governor 17 enclosed in a housing attached to the side of the pressure tank 12 and provided with a pressure indicator 18. The pressure governor 17 may consist of a suitable pressure responsive electric switch for controlling the motor starter, which is enclosed in the housing 19 attached to the side of housing 13, the electrical connections being effected by means of conductors in the conduit 20.

The pressure tank 12 is preferably provided with a suitable gauge glass 21, access of liquid to which is controlled by valves 22, 23 so that the gauge glass can be shut off for repair without disabling the system.

The air volume control is indicated at 24, and is carried by the side of the pressure tank 12 and connected with the pump by a relatively small air piping 25. The electric motor, pump, controlling and indicating devices are all standard commercial devices, and therefore need not be described any further.

The sump tank 11 preferably serves as a base for the unit, and it may include a welded steel base 26, which comprises a substantially rectangular metal plate having rounded corners 27 provided with upper and lower plane surfaces.

The side walls of the sump tank 11 may consist of a plate of sheet metal 27, which is bent to substantially cylindrical form, having its abutting edges welded together to form a cylinder, the lower end of which is welded to the bottom plate 26 along the full length of the abutting contact between the side walls and the bottom plate.

For convenience in installation, the side wall 27' of the sump tank 11 is preferably provided with an inlet aperture 28 on each of four sides, the apertures 28 being equally spaced from each other by ninety degrees. Each of these apertures 28 is provided with a cast metal sleeve 29, which has a bore 30 that is provided with pipe threads, and the engaging surface 31 of each fitting 29 is curved cylindrically to have a substantial fit with the side wall 27, to which it is welded at 32.

Three of these inlet openings are closed by means of the threaded plugs 33, the fourth one being utilized for receiving the return pipe 34. By means of these alternative inlets the piping for the system may be connected to the accumulator unit on any side, and the accumulator unit may be oriented as desired for best access to the oil-gas pressure governor and other parts.

At its upper end the sump tank 11 is provided with a top plate 35, which preferably comprises a cast metal member having an upper plane surface and a lower surface, which is plane, except for the protrusion of four radially extending reinforcing ribs 36, which terminate at an inner cylindrically curved surface 37 that is adapted to engage the side wall 27'.

For the purpose of standardization the bottom plate 36 may also be provided with the reinforcing ribs 38, each of which is provided with a through bore 39 that may be used for the passage of bolts or lag screws that secure the unit to the floor or other supporting foundation.

The bottom and top plates 26 and 35 are preferably substantially rectangular in shape, with rounded corners; and this permits the location of the reinforcing ribs 38 at the corners, extending radially and diagonally inward and outside of the cylindrical wall 27', as shown in Fig. 6.

The ribs 36 and 38 may be rectangular in cross section, and the through bores in the reinforcing ribs 36 are utilized for receiving the bolts 40, which secure the sump tank 11 and the pressure tank 12 together. Suitable apertures 41 and 42 are provided in the top plate 35 of the sump tank 11 for passing the suction pipe 43 and a return pipe 44. These apertures 41, 42 are preferably not provided with liquid-tight fittings, but may have a fiber or metal cover plate 45, which closely surrounds each pipe 43 or 44, and is pinned in place by means of headed pins 46 driven through the plates 45 and frictionally held in suitably drilled apertures in the top plate 35.

Closure plates 45 keep the dust and dirt out of the sump tank 11, but do not prevent the entrance of air into the sump tank, which is necessary as liquid is pumped out of it, or air may be forced out of the sump tank as liquid is returned to it through the return pipe 34.

The filler plug 33a shown at the top of Fig. 6 is preferably provided with a small air vent which is formed by an axially extending and a radially extending drilled hole, thereby forming a right angle passage, through which the air may enter or leave the sump tank.

Except for the top apertures 41, 42, however, all of the points of contact between the side walls 27 and the bottom plate 26 and top plate 35 are welded together in a liquid-tight manner, and the sump tank is preferably of such capacity that it will contain all of the hydraulic liquid of the system so that it will never overflow through the apertures 41, 42 under any conditions of use.

The housing 13 for enclosing the chamber 14 for the motor, pump, etc., is formed by means of a plurality of plane sheet metal side wall sections, such as, for example, four such sections, indicated at 47, 48, 49, 50, carried by columns 52. This housing also includes the top plate 35 of the sump tank 11 and the bottom plate 51 of the pressure tank 12.

The bottom plate of the pressure tank 12 may be substantially similar in construction to the top plate 35 of the sump tank 11, but it is inverted and its reinforcing ribs 36 are likewise provided with through apertures for receiving the bolts 40.

In order to secure these two tanks together the end plates 35 and 51 are spaced from each other by means of a plurality of columns, preferably four in number, one column being disposed at each of the four corners of the plates 35, 51.

These columns may be similar in construction, and therefore only one need be described. Each column 52 may consist of an elongated cast metal member having a curved body 53 and having at each end an integral bearing plate 54, 55. A curved body 53 comprises a substantially partially cylindrical portion 56, which is extended tangentially by a straight portion 57, 58 at each edge.

The two straight portions 57, 58 extend at right angles to each other. The outer surface of the two straight flange portions 57, 58 is rabbeted at 59 and 60 to receive the side wall sections 47-50, which form the side walls of the housing 13, enclosing the motor and pump.

The side wall sections 47-50 are secured to the columns by means of the through bolts 61 (Fig. 1) which pass through apertures in the side plates, and are threaded into the columns 52 at the flanges 57, 58. Thus, any side plate may be removed for access to the motor and pump and associated parts.

The columns 52 are secured in place by means of the bolts 40, which are threaded at both ends and are of sufficient length to extend through the column-bearing end plates 54, 55 and through the end plate 35 of the sump tank 11 and the end plate 51 of the pressure tank 12 at the reinforcing ribs 36, where these bolts 40 are provided with nuts 62 at their threaded ends.

Thus, plates 51 and 35 may be clamped together by means of bolts 40 against the columns 52, and the pressure tank 11 is spaced from the sump tank sufficiently to provide a chamber 14 for the motor and pump.

The pressure tank 12 preferably includes, in addition to the supporting base or end plate 51, the cylindrical side wall 63, the curved tank bottom 64, and a curved tank top 65. The tank top 65 preferably has a partially cylindrical flange portion 66, which fits inside the cylindrical side wall 63, where it is firmly welded along the edge of the flange 66 and also along the upper edge 67 of the side wall 63.

The tank bottom 64 may be similar in shape to the tank top 65, and it is preferably curved upwardly, and its depending cylindrical flange 68 is welded to the side wall 63 in a similar manner, thus providing a pressure tank of maximum strength.

Like the sump tank 11, the pressure tank 12 is preferably provided with a plurality of outlet fittings 69 secured to the pressure tank 12 at the outlet openings in the same way as described with respect to the sump tank, and all of these outlet openings may be closed by screw plugs 70, except the one which is to be used for connection to the outlet pipe 71.

One of the fittings 69 may be used for the lower connection to the gauge glass valve, and a similar one is again provided in an upper part of the tank 12 for the upper gauge glass valve.

The electric motor 15 may be mounted upon a suitable base 72, comprising a pair of metal pads welded to the top plate 35. The end of the motor housing 15 may be suitably flanged at 73 to support a flanged base 74 for the pump 16, which is carried by the motor. A suitable universal joint 75 is interposed between the motor shaft and the pump shaft.

The inlet to the pump is connected by means of suction pipe 43 to a strainer 76 located adjacent to, but spaced from, the bottom of the sump tank 11. The outlet of the pump is connected by suitable pipe connections 77 to the pressure tank 12 through the base plate 51 and bottom plate 64, as shown in Fig. 7.

Referring to Fig. 9, the present hydraulic accumulator unit is shown in this figure in connection with a hydraulic cylinder of the type which is used for a brake engine on a mine hoist. The outlet pipe 71 from the pressure tank 12 communicates through a gate valve 78 with a control valve 79, such as a valve of the piston type controlled by piston rod 80 and a mine hoist lever (not shown).

The return pipe 34 from the valve 79 leads to the sump tank. Control valve 79 is suitably provided with ports and communicates through port 81 with the interior of the hydraulic cylinder 82, having plunger 83. The plunger 83 actuates a connecting rod 84, to which it is preferably universally connected for actuating the brake. The control valve 79 preferably comprises a piston valve provided with suitable ports so that in one position the pressure is admitted to the hydraulic cylinder 82 from the high pressure line 71, and the return line 34 is shut off by the valve 79.

In another position of the valve piston the pressure line 71 is shut off and the port 81 to the hydraulic cylinder 82 is placed in communication with the return line 34, permitting the weight of the plunger and other parts to force the liquid out of the cylinder 82 into the sump tank.

In another intermediate position both the pressure line and the return are shut off so that the plunger is held in fixed position by the liquid under pressure in the hydraulic cylinder 82.

The operation of the pressure system is as follows: The tanks are provided with a suitable supply of hydraulic liquid, such as oil, and after a suitable amount of oil is pumped from the sump tank into the pressure tank, compressed air is admitted to the upper part of the pressure tank through a valve in the top or side of the tank, and then more oil is pumped in at the bottom of the pressure tank to fill the tank until it is about one-third or one-half full of oil.

This raises the pressure of the oil in inverse ratio to the volume of the space into which the air is compressed. When the pressure reaches a predetermined amount, the automatic pressure governor actuates a switch which shuts off the motor and stops the pump. When oil is drawn off through the pressure line, allowing the air to expand and the pressure to drop to a predetermined amount, the pressure governor will again start the pump.

In the event that the required pressure has been reached before a sufficient amount of oil has been pumped into the pressure tank, air is bled off by a valve in the upper part of the pressure tank until a sufficient amount of oil is admitted.

In the event that the oil tends to rise too high in the pressure tank, the air volume control comes into action. It consists of a float control valve disposed within the tank at such a height that when the oil reaches a required height the float opens a small valve, admitting air from the atmosphere, which is piped from thence to the oil pump, thereby making the pump discharge air instead of oil into the pressure tank.

This continues until the pressure within the tank causes the pressure governor to stop the pump. A gauge glass on the side of the pressure tank indicates the height of oil within the tank.

As oil is released from the pressure tank by means of the control valve 79 to perform work on the plunger 83 in the cylinder 82, it is later returned to the sump tank at atmospheric pressure. From the sump tank it is again pumped back to the pressure tank, thereby storing the energy which is used to pump the liquid against the pressure in the pressure tank until this energy is needed.

It will thus be observed that I have invented an improved hydraulic pressure unit of rigid steel welded construction which can be "knocked down" and conveniently shipped. Since the pressure tank is supported above the sump tank with an intermediate chamber for the motor and pump, the assembly is very compact and rigid, and requires a very small amount of floor space. The pump and motor are enclosed and protected, but they are immediately accessible by removing one of the side plates, and the complete assembly is light in weight and economical in the use of material, and adaptable to various types of installations.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A hydraulic pressure accumulator unit comprising a sump tank forming a base, a pressure tank located above the sump tank and carried thereby, an electric motor and a pressure pump mounted on said sump tank, and intermediate connecting frame members for supporting the pressure tank on the sump tank and providing an intermediate space for said electric motor and pressure pump.

2. A hydraulic pressure accumulator unit comprising a sump tank forming a base, a pressure tank located above the sump tank and carried thereby, an electric motor and a pressure pump mounted on said sump tank, and intermediate connecting frame members for supporting the pressure tank on the sump tank and providing an intermediate space for said electric motor and pressure pump, said intermediate connecting frame members comprising a plurality of columns engaging the sump tank at one end and the pressure tank at the other end and tension means for drawing the pressure tank toward the sump tank against said columns.

3. A hydraulic pressure accumulator unit comprising a sump tank forming a base, a pressure tank located above the sump tank and carried thereby, an electric motor and a pressure pump mounted on said sump tank, and intermediate connecting frame members for supporting the pressure tank on the sump tank and providing an intermediate space for said electric motor and pressure pump, said intermediate connecting frame members comprising a plurality of columns engaging the sump tank at one end and the pressure tank at the other end and tension means for drawing the pressure tank toward the sump tank against said columns, said tension means comprising a threaded member for each column, passing through a part of the column and through a part on each tank.

4. In a hydraulic pressure accumulator unit a sump tank comprising a substantially rectangular base member of metal having at each corner a radially extending reinforcing rib provided with a bore for securing members, a sheet metal steel wall engaging the ends of said ribs and formed of substantially cylindrical shape welded to said base member, and a similar top plate welded to the other end of said wall to form a closed tank, the said cylindrical member being provided upon its four sides with apertures fitted with cast metal threaded outlets welded in place on each of said four sides.

5. In a hydraulic pressure accumulator unit a sump tank comprising a substantially rectangular base member of metal having at each corner a radially extending reinforcing rib provided with a bore for securing members, a sheet metal steel wall engaging the ends of said ribs and formed of substantially cylindrical shape welded to said base member, and a similar top plate welded to the other end of said wall to form a closed tank, a pressure tank having a lower base member of substantially rectangular shape supporting a cylindrical side wall, said pressure tank base having radially extending reinforcing ribs at each corner provided with through bores, spacing means for spacing the pressure tank from the sump tank in vertical relation to the sump tank, and a plurality of threaded members, one located at each corner of the assembly and passing through the bores in the base of the pressure tank and the top plate of the sump tank for clamping the two tanks against said spacing means to form a unitary assembly with a housing space between the tanks.

6. In a hydraulic pressure accumulator unit a sump tank comprising a substantially rectangular base member of metal having at each corner a radially extending reinforcing rib provided with a bore for securing members, a sheet metal steel wall engaging the ends of said ribs and formed of substantially cylindrical shape welded to said base member, and a similar top plate welded to the other end of said wall to form a closed tank, a pressure tank having a lower base member of substantially rectangular shape supporting a cylindrical side wall, said pressure tank base having radially extending reinforcing ribs at each corner provided with through bores, spacing means for spacing the pressure tank from the sump tank in vertical relation to the sump tank, and a plurality of threaded members, one located at each corner of the assembly and passing through the bores in the base of the pressure tank and the top plate of the sump tank for clamping the two tanks against said spacing means to form a unitary assembly with a housing space between the tanks, said spacing means comprising a plurality of columns, one column being located at each corner of the assembly adjacent the threaded member.

7. In a hydraulic pressure accumulator unit a sump tank comprising a substantially rectangular base member of metal having at each corner a radially extending reinforcing rib provided with a bore for securing members, a sheet metal steel wall engaging the ends of said ribs and formed of substantially cylindrical shape welded to said base member, and a similar top plate welded to the other end of said wall to form a closed tank, a pressure tank having a lower base member of substantially rectangular shape supporting a cylindrical side wall, said pressure tank base having radially extending reinforcing ribs at each corner provided with through bores, spacing means for spacing the pressure tank from the sump tank in vertical relation to the sump tank, and a plurality of threaded members, one located at each corner of the assembly and passing through the bores in the base of the pressure tank and the top plate of the sump tank for clamping the two tanks against said spacing means to form a unitary assembly with a housing space between the tanks, said spacing means comprising a plurality of columns, one column being located at each corner of the assembly adjacent the threaded member, and each column comprising a cast metal member having flanges at right angles to each other, said flanges being joined by a curved corner portion having an easy curvature.

8. In a hydraulic pressure accumulator unit a sump tank comprising a substantially rectangular base member of metal having at each corner a radially extending reinforcing rib provided with a bore for securing members, a sheet metal steel wall engaging the ends of said ribs and formed of substantially cylindrical shape welded to said base member, and a similar top plate welded to the other end of said wall to form a closed tank, a pressure tank having a lower base member of substantially rectangular shape supporting a cylindrical side wall, said pressure tank base having radially extending reinforcing ribs at each corner provided with through bores, spacing means for spacing the pressure tank from the sump tank in vertical relation to the sump tank, and a plurality of threaded members, one located at each corner of the assembly and passing through the bores in the base of the pressure tank and the top plate of the sump tank for clamping the two tanks against said spacing means to form a unitary assembly with a housing space between the tanks, said spacing means comprising a plurality of columns, one column being located at each corner of the assembly adjacent the threaded member, each column being provided with top and bottom bearing plates apertured to receive said threaded member.

9. In a hydraulic pressure accumulator unit a sump tank comprising a substantially rectangular base member of metal having at each corner a radially extending reinforcing rib provided with a bore for securing members, a sheet metal steel wall engaging the ends of said ribs and formed of substantially cylindrical shape welded to said base member, and a similar top plate welded to the other end of said wall to form a closed tank, a pressure tank having a lower base member of substantially rectangular shape supporting a cylindrical side wall, said pressure tank base having radially extending reinforcing ribs at each corner provided with through bores, spacing means for spacing the pressure tank from the sump tank in vertical relation to the sump tank, and a plurality of threaded members, one located at each corner of the assembly and passing through the bores in the base of the pressure tank and the top plate of the sump tank for clamping the two tanks against said spacing means to form a unitary assembly with a housing space between the tanks, said spacing means comprising a plurality of columns, one column being located at each corner of the assembly adjacent the threaded member, each column being provided with top and bottom bearing plates apertured to receive said threaded member, and a plurality of side plates for enclosing the space between the tanks and having removable means for securing them to the columns.

10. In a hydraulic pressure accumulator unit, the combination of a sump tank and a pressure tank, said sump tank comprising a substantially cylindrical wall welded to a pair of end plates and said pressure tank comprising a cylindrical wall welded to a pair of end members, the lower of said members comprising a metal plate, the adjacent end plates of said pressure tank and sump tank being of greater size than their tanks and having registering through apertures, spacing means between said sump tank and said pressure tank for spacing the pressure tank vertically from the sump tank, and threaded members passing through the apertures in said adjacent end plates and clamping the tanks on said spacing means.

11. In a hydraulic pressure accumulator unit, the combination of a sump tank and a pressure tank, said sump tank comprising a substantially cylindrical wall welded to a pair of end plates and said pressure tank comprising a cylindrical wall welded to a pair of end members, the lower of said members comprising a metal plate, the adjacent end plates of said pressure tank and sump tank being of greater size than their tanks and having registering through apertures, spacing means between said sump tank and said pressure tank for spacing the pressure tank vertically from the sump tank, and threaded members passing through the apertures in said adjacent end plates and clamping the tanks on said spacing means, said spacing means comprising a plurality of columns, one located at each of said threaded members.

12. In a hydraulic pressure accumulator unit, the combination of a sump tank and a pressure tank, said sump tank comprising a substantially cylindrical wall welded to a pair of end plates and said pressure tank comprising a cylindrical wall welded to a pair of end members, the lower of said members comprising a metal plate, the adjacent end plates of said pressure tank and sump tank being of greater size than their tanks and having registering through apertures, spacing means between said sump tank and said pressure tank for spacing the pressure tank vertically from the sump tank, and threaded members passing through the apertures in said adjacent end plates and clamping the tanks on said spacing means, said spacing means comprising a plurality of columns, one located at each of said threaded members, each of said columns being provided with a bearing flange for engaging the adjacent tank, and said bearing flanges being provided with apertures for said threaded members.

13. In a hydraulic pressure accumulator unit, the combination of a sump tank and a pressure tank, said sump tank comprising a substantially cylindrical wall welded to a pair of end plates and said pressure tank comprising a cylindrical wall welded to a pair of end members, the lower of said members comprising a metal plate, the adjacent end plates of said pressure tank and sump tank being of greater size than their tanks and having registering through apertures, spacing means between said sump tank and said pressure tank for spacing the pressure tank vertically from the sump tank, and threaded members passing through the apertures in said adjacent end plates and clamping the tanks on said spacing means, said spacing means comprising a plurality of columns, one located at each of said threaded members, each of said columns being provided with a bearing flange for engaging the adjacent tank, and said bearing flanges being provided with apertures for said threaded members, the columns and threaded members being located at the corners of a polygon, and side plates adjoining the columns and removably secured thereto for enclosing the space between the tanks to form a housing.

14. In a hydraulic pressure accumulator unit, the combination of a sump tank and a pressure tank, said sump tank comprising a substantially cylindrical wall welded to a pair of end plates and said pressure tank comprising a cylindrical wall welded to a pair of end members, the lower of said members comprising a metal plate, the adjacent end plates of said pressure tank and sump tank being of greater size than their tanks and having registering through apertures, spacing means between said sump tank and said pressure tank for spacing the pressure tank vertically from the sump tank, and threaded members passing through the apertures in said adjacent end plates and clamping the tanks on said spacing means, said spacing means comprising a plurality of columns, one located at each of said threaded members, each of said columns being provided with a bearing flange for engaging the adjacent tank, and said bearing flanges being provided with apertures for said threaded members, the columns and threaded members being located at the corners of a polygon, and side plates adjoining the columns and removably secured thereto for enclosing the space between the tanks to form a housing, each of said columns being recessed to receive edge portions of the side plates so that the external surface of the side plates is flush with the major portion of the external surface of said columns.

HENRY H. LOGAN.